(12) United States Patent
Saito et al.

(10) Patent No.: US 12,479,769 B2
(45) Date of Patent: *Nov. 25, 2025

(54) INORGANIC MATERIAL POWDER AND METHOD OF MANUFACTURING A STRUCTURAL BODY

(71) Applicant: CANON KABUSHIKI KAISHA, Tokyo (JP)

(72) Inventors: Hiroshi Saito, Kanagawa (JP); Yasuhiro Sekine, Kanagawa (JP); Nobuhiro Yasui, Kanagawa (JP); Kanako Oshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 699 days.

This patent is subject to a terminal disclaimer.

(21) Appl. No.: 17/340,278

(22) Filed: Jun. 7, 2021

(65) Prior Publication Data

US 2021/0292240 A1 Sep. 23, 2021

Related U.S. Application Data

(63) Continuation of application No. PCT/JP2019/049338, filed on Dec. 17, 2019.

(30) Foreign Application Priority Data

Dec. 21, 2018 (JP) ................................. 2018-240158
Dec. 5, 2019 (JP) ................................. 2019-220766

(51) Int. Cl.
*B29C 64/153* (2017.01)
*B28B 1/00* (2006.01)
(Continued)

(52) U.S. Cl.
CPC ............ *C04B 35/119* (2013.01); *B28B 1/001* (2013.01); *B33Y 10/00* (2014.12); *B33Y 70/00* (2014.12);
(Continued)

(58) Field of Classification Search
None
See application file for complete search history.

(56) References Cited

U.S. PATENT DOCUMENTS 10,710,157 B2 7/2020 Ibe et al.
10,759,712 B2 9/2020 Yasui et al.
(Continued)

FOREIGN PATENT DOCUMENTS

CN 103553597 A 2/2014
CN 103602979 A 2/2014
(Continued)

OTHER PUBLICATIONS

Cook & Sorensen, Overview of transient liquid phase and partial transient liquid phase bonding, J. Mater. Sci. 46, 5305 (2011) (Year: 2011).*

(Continued)

*Primary Examiner* — Yung-Sheng M Tsui
(74) *Attorney, Agent, or Firm* — Venable LLP (57) ABSTRACT

To achieve local melting of an inorganic material powder containing an inorganic material as a main component in an additive manufacturing technology, to thereby achieve high shaping accuracy. Provided is an inorganic material powder to be used in an additive manufacturing method involving performing shaping through irradiation with laser light, the inorganic material powder including: a base material that is an inorganic material; and an absorber, wherein the absorber has a higher light-absorbing ability than the base material for light having a wavelength included in the laser light, and contains any one of $Ti_2O_3$, TiO, SiO, ZnO, antimony-doped tin oxide (ATO), and indium-doped tin oxide (ITO), or contains any one of a transition metal carbide, a transition metal nitride, $Si_3N_4$, AlN, a boride, and a silicide.

20 Claims, 3 Drawing Sheets

(51) Int. Cl.
  *B33Y 10/00* (2015.01)
  *B33Y 70/00* (2020.01)
  *C04B 35/117* (2006.01)
  *C04B 35/119* (2006.01)
  *C04B 35/14* (2006.01)
  *C04B 35/468* (2006.01)
  *C04B 35/49* (2006.01)
  *C04B 35/491* (2006.01)
  *C04B 35/63* (2006.01)
  *C04B 35/64* (2006.01)

(52) U.S. Cl.
  CPC ............ *C04B 35/117* (2013.01); *C04B 35/14* (2013.01); *C04B 35/4682* (2013.01); *C04B 35/49* (2013.01); *C04B 35/491* (2013.01); *C04B 35/6303* (2013.01); *C04B 35/64* (2013.01); *C04B 2235/3206* (2013.01); *C04B 2235/3217* (2013.01); *C04B 2235/3224* (2013.01); *C04B 2235/3225* (2013.01); *C04B 2235/3236* (2013.01); *C04B 2235/3237* (2013.01); *C04B 2235/3246* (2013.01); *C04B 2235/3284* (2013.01); *C04B 2235/3293* (2013.01); *C04B 2235/3296* (2013.01); *C04B 2235/3418* (2013.01); *C04B 2235/3804* (2013.01); *C04B 2235/3813* (2013.01); *C04B 2235/3839* (2013.01); *C04B 2235/3843* (2013.01); *C04B 2235/3865* (2013.01); *C04B 2235/3873* (2013.01); *C04B 2235/3886* (2013.01); *C04B 2235/3891* (2013.01); *C04B 2235/442* (2013.01); *C04B 2235/5436* (2013.01); *C04B 2235/6026* (2013.01); *C04B 2235/665* (2013.01)

(56) References Cited

U.S. PATENT DOCUMENTS

| | | | |
|---|---|---|---|
| 10,974,498 | B2 | 4/2021 | Achten et al. |
| 2012/0237745 | A1* | 9/2012 | Dierkes ............... C04B 35/4885 427/532 |
| 2016/0052162 | A1 | 2/2016 | Colin et al. |
| 2016/0083303 | A1* | 3/2016 | Mironets ............... C04B 35/486 264/497 |
| 2018/0170811 | A1 | 6/2018 | Osada et al. |
| 2019/0054653 | A1 | 2/2019 | Kimura et al. |
| 2019/0134893 | A1 | 5/2019 | Yabuta et al. |
| 2019/0300441 | A1 | 10/2019 | Kubota et al. |
| 2020/0140340 | A1 | 5/2020 | Yasui et al. |
| 2020/0346982 | A1 | 11/2020 | Yasui et al. |
| 2021/0031403 | A1 | 2/2021 | Oshima et al. |
| 2021/0309575 | A1 | 10/2021 | Ohashi et al. |

FOREIGN PATENT DOCUMENTS

| | | |
|---|---|---|
| CN | 103709737 A | 4/2014 |
| CN | 105272248 A | 1/2016 |
| EP | 0 443 624 A1 | 8/1991 |
| EP | 2 784 045 A1 | 10/2014 |
| EP | 3 312 151 A1 | 4/2018 |
| JP | 2011-21218 A | 2/2011 |
| JP | 4984992 B2 | 7/2012 |
| JP | 2016-527161 | 9/2016 |
| JP | 2016-527161 A | 9/2016 |
| JP | 2017-071532 A | 4/2017 |
| JP | 2019-19501 A | 2/2019 |
| WO | 2015/012911 A2 | 1/2015 |
| WO | 2017/110829 A1 | 6/2017 |
| WO | WO 2017/110829 | 6/2017 |
| WO | 2017/135387 A1 | 8/2017 |
| WO | WO 2017/135387 | 8/2017 |
| WO | 2018/122142 A1 | 7/2018 |
| WO | 2020/129958 A1 | 6/2020 |

OTHER PUBLICATIONS

Ohashi et al. U.S. Appl. No. 17/331,906, filed May 27, 2021.
Liliana Moniz et al., "Laser Beam Melting of Alumina: Effect of Absorber Additions," 70(3) JOM 328-335 (2018) (XP036428129).
Loïc Ferrage et al., "Dense yttria-Stabilized Zirconia Obtained by Direct Selective Laser Sintering," 21 Addit. Manuf. 472-478 (May 2018) (XP055762109).
Enrique Juste et al., "Shaping of Ceramic Parts by Selective Laser Melting of Powder Bed," 29(17) J. Mater. Res. 2086-2094 (2014) (XP055431299).
Shuai Chang et al., "Selective Laser Sintering of Porous Silica Enabled by Carbon Additive," 10(11) Mater. 1313 (1-11) (Nov. 2017) (XP055878830).
Nikolay K. Tolochko et al., "Absorptance of Powder Materials Suitable for Laser Sintering," 6(3) Rapid Prototyping J. 155-161 (2000) (XP055065098).
Shunsuke Yoshioka et al., "On the Use of TIC as high-Temperature Healing Particles in Alumina Based Composites," 36(16) J. Eur. Ceram. Soc. 4155-4162 (2016) (XP029693642).
Shunsuke Yoshioka et al., "Self-Healing Behavior of Self-Healing Mullite," 2012 The Proceedings of Mechanical Engineering Congress, Japan, vol. 2012, pp. 1-5 (2012) (XP055514015).
Extended European Search Report in European Application No. 19897978.3 (Jul. 2022).
Yves-Christian Hagedorn et al., "Net Shaped High Performance Oxide Ceramic Parts by Selective Laser Melting," 5 Physics Procedia 587-594 (2010).
International Search Report in International Application No. PCT/JP2019/049338 (Feb. 2020).
International Preliminary Report on Patentability in International Application No. PCT/JP2019/049338 (Jul. 2021).
Notice of Reasons for Refusal in Japanese Application No. 2019-220766 (Oct. 2023).
First Office Action in Chinese Application No. 201980083168.4 (Mar. 2022).
Meng Xianming et al., "Introduction to 3D Printing Technology," p. 112 (Oct. 2018).
Second Office Action in Chinese Application No. 202310007202.8 (Aug. 2024).
Notice of Reasons for Refusal in Japanese Application No. 2019-220766 (Feb. 2024).
First Office Action in Chinese Application No. 202310007202.8 (Feb. 2024).

* cited by examiner

INORGANIC MATERIAL POWDER AND METHOD OF MANUFACTURING A STRUCTURAL BODY

CROSS-REFERENCE TO RELATED APPLICATIONS

This application is a Continuation of International Patent Application No. PCT/JP2019/049338, filed Dec. 17, 2019, which claims the benefit of Japanese Patent Application No. 2018-240158, filed Dec. 21, 2018 and Japanese Patent Application No. 2019-220766 filed Dec. 5, 2019, all of which are hereby incorporated by reference herein in their entirety.

BACKGROUND OF THE INVENTION

Field of the Invention

The present invention relates to an inorganic material powder suitable as a raw material in manufacture of a structural body formed of inorganic compounds by an additive manufacturing technology, and to a manufacturing method using the inorganic material powder.

Description of the Related Art

In recent years, an additive manufacturing technology has been advanced, and elaborate and diverse structural bodies have been achieved in powder bed fusion using a resin powder or a metal powder as a raw material. In powder bed fusion using a powder containing an inorganic compound as a raw material, in order to melt the inorganic compound, which generally has a higher melting point than a metal, in the same manner as with the metal, corresponding energy needs to be input. In addition, when the powder containing the inorganic compound is irradiated with a laser, light diffusion occurs in the powder containing the inorganic compound unlike the metal powder, and hence local melting cannot be performed. Accordingly, shaping is difficult to perform with high shaping accuracy. As a countermeasure, a technique involving securing shaping accuracy by only sintering the powder containing the inorganic compound without melting the powder has been used, and hence an elaborate structural body has not been able to be obtained.

Under such circumstances, in Physics Procedia 5 (2010) 587-594, there is a proposal of a technique for obtaining a structural body from a powder containing inorganic compounds, involving lowering the melting point of the powder through use of an $Al_2O_3$—$ZrO_2$ eutectic system.

However, a large number of protrusions (several hundred μm) are found on the surface of the structural body of Physics Procedia 5 (2010) 587-594, and hence sufficient shaping accuracy has not been obtained. Further, there is also a problem in that, in each of an in-plane direction and a stacking direction, a site where shaping through laser light irradiation has been completed around a site to be irradiated with laser light gets processed by absorbing laser light again, and hence the shaping accuracy is adversely influenced.

The present invention has been made in order to solve such problems, and achieves high shaping accuracy by melting a powder containing inorganic compounds in an additive manufacturing method, in particular, powder bed fusion.

SUMMARY OF THE INVENTION

According to one aspect of the present invention, there is provided an inorganic material powder to be used in an additive manufacturing method involving performing shaping through irradiation with laser light, the inorganic material powder including: an inorganic compound serving as a base material; and an absorber, wherein the absorber has a higher light-absorbing ability than the base material for light having a wavelength included in the laser light, and is at least one selected from the group consisting of $Ti_2O_3$, Tibo, SiO, ZnO, antimony-doped tin oxide (ATO), indium-doped tin oxide (ITO), MnO, $MnO_2$, $Mn_2O_3$, $Mn_3O_4$, FeO, $Fe_2O_3$, $Fe_3O_4$, $Cu_2O$, CuO, $Cr_2O_3$, $CrO_3$, NiO, $V_2O_3$, $VO_2$, $V_2O_5$, $V_2O_4$, $Co_3O_4$, and CoO.

According to another aspect of the present invention, there is provided an inorganic material powder to be used in an additive manufacturing method involving performing shaping through irradiation with laser light, the inorganic material powder including: an inorganic compound serving as a base material; and an absorber, wherein the absorber has a higher light-absorbing ability than the base material for light having a wavelength included in the laser light, and is at least one selected from the group consisting of a transition metal carbide, a transition metal nitride, $Si_3N_4$, AlN, a boride, and a silicide.

According to still another aspect of the present invention, there is provided a method of manufacturing a structural body including repeating the following steps: Step (i): a step of placing the above-mentioned inorganic material powder at a site to be irradiated with the laser light; and Step (ii): a step of irradiating a predetermined site of the inorganic material powder with the laser light to sinter, or melt and solidify the inorganic material powder.

Further features of the present invention will become apparent from the following description of exemplary embodiments with reference to the attached drawings.

DESCRIPTION OF THE EMBODIMENTS

Modes for carrying out the present invention are described below with reference to the drawings.

First, an inorganic material powder (hereinafter sometimes referred to simply as "powder") in one of the modes for carrying out the present invention (hereinafter referred to as "this embodiment"), and a base material and an absorber that are contained therein are described. The base material and the absorber are each formed of an inorganic compound.

The inorganic material powder is a collection of particles that can be recognized as independent particles, and is formed of a plurality of compounds. Each of the particles may be a product obtained by sintering a plurality of particles, and may be noncrystalline or crystalline. In this embodiment, that the powder is formed of a plurality of compounds encompasses, for example, a case of a mixture of a plurality of kinds of particles each formed of one kind of compound, or a case of one kind, or a mixture of a plurality of kinds, of particles each formed of a plurality of kinds of compounds. The absorber is defined as a compound having a relatively high light-absorbing ability for laser light to be radiated in a manufacturing process of a structural body, as compared to other compounds contained in the powder (excluding a compound contained at a content ratio of less than 1,000 ppm, i.e., at an impurity level). The absorber preferably has a light-absorbing ability of 10% or more for light having a certain wavelength included in the laser light to be radiated in the manufacturing process of a structural body, and the light-absorbing ability is more preferably 40% or more, still more preferably 60% or more.

A general spectrometer may be used for the measurement of the light-absorbing ability of the absorber. A powder of the absorber loaded in a sample dish is irradiated with an assumed wavelength (the wavelength of the laser to be radiated in the manufacturing process and/or a wavelength in the vicinity thereof), and reflection is measured using an integrating sphere. Reflection in the case where the sample is absent is used as reference data, and the light-absorbing ability may be calculated from a ratio thereto.

(Inorganic Material Powder)

The inorganic material powder according to this embodiment contains a plurality of compounds, and contains at least one kind of compound serving as the absorber. Specifically, each of the particles contained in the powder may be formed of one kind of compound, or one particle may be formed of a plurality of compounds. Different cases are described below one by one.

First, a case in which each of the particles contained in the inorganic material powder is formed of one kind of compound is described. When the inorganic material powder contains three kinds of compounds, i.e., $Al_2O_3$, $ZrO_2$, and $Ti_2O_3$ (absorber), there is given, for example, a state in which the inorganic material powder is configured as a mixture of $Al_2O_3$ particles, $ZrO_2$ particles, and $Ti_2O_3$ particles.

Next, a case in which each of the particles contained in the inorganic material powder is formed of a plurality of compounds is described. When the inorganic material powder contains three kinds of compounds, i.e., $Al_2O_3$, $ZrO_2$, and $Ti_2O_3$ (absorber), the inorganic material powder may be formed of particles each formed of $Al_2O_3$, $ZrO_2$, and $Ti_2O_3$. Alternatively, the inorganic material powder may be formed of particles each formed of $Al_2O_3$ and $ZrO_2$ and particles each formed of $Ti_2O_3$. When the absorber is incorporated into the same particles with any other compound, the absorber is preferably incorporated into the particles so as to be in a state of showing a high light-absorbing ability. Specifically, when the absorber is $Ti_2O_3$, a state of being $Ti_2O_3$ is preferably maintained. That is, it is preferred to prevent the following state from occurring: in the process of producing the particles each formed of $Al_2O_3$ and $Ti_2O_3$, all of $Ti_2O_3$ reacts with $Al_2O_3$ to be converted into $Al_2TiO_5$ or the like.

The compound serving as the absorber is particularly preferably in a state of forming particles alone irrespective of how any other compound contained in the inorganic material powder is contained. This is because, when the compound serving as the absorber forms particles alone, a relatively higher light-absorbing ability is obtained than in a state of being contained in the same particles with any other compound. Another reason is that, when the absorber forms particles alone, laser light can easily reach the absorber to enable efficient utilization of the light-absorbing ability of the absorber.

In a situation where a powder bed layer is formed using a recoater in powder bed fusion, or in a situation where a powder is jetted from a nozzle in a cladding method, it is important that the inorganic material powder have fluidity appropriate therefor. Accordingly, the inorganic material powder according to this embodiment preferably satisfies a fluidity index of 40 [sec/50 g] or less. In order to secure such fluidity, the particles each preferably have a spherical shape. However, as long as the above-mentioned fluidity index can be satisfied, the particles do not need to each have a spherical shape.

The particle size of each of particles containing compounds including the base material other than the absorber is preferably 5 μm or more and larger than that of particles each formed of the absorber from the viewpoint of achieving preferred fluidity. The particle size is more preferably 5 μm or more and 5 or more times as large as that of the particles each formed of the absorber. The particle size is still more preferably 10 μm or more and 5 or more times as large as that of the particles each formed of the absorber. In addition, from the viewpoint of obtaining high shaping accuracy, and the viewpoint of the ease of sintering or melting, the particle size is preferably 200 μm or less, more preferably 150 μm or less. The compounds contained in the inorganic material powder other than the absorber are hereinafter collectively referred to as "base material".

Meanwhile, it is preferred that the particle size of the particles each formed of the absorber alone fall within the range of 10 μm or less, and be ⅕ or less of the particle size of the particles each formed of the base material. When particles each formed of the absorber alone in this range are used, heat generated through absorption of laser light by the absorber is efficiently transferred to the base material to facilitate the melting of the powder in a portion that has been irradiated with laser light. From the viewpoint of the dispersibility and high packing density of the absorber in the inorganic material powder, the particle size of the particles each formed of the absorber alone is preferably as small as possible. Meanwhile, when the particle size of the particles each formed of the absorber alone is 1 μm or more, the particles are hardly scattered into an atmosphere through irradiation with laser light, and hence an amount thereof required as the absorber can be reliably maintained in the inorganic material powder. Accordingly, the particle size of the particles each formed of the absorber alone is preferably 1 μm or more and 10 μm or less, more preferably 1 μm or more and less than 5 μm.

In addition, the particle size of particles each containing the absorber and the base material is preferably 5 μm or more from the viewpoint of achieving preferred fluidity. The particle size is more preferably 5 μm or more and 5 or more times as large as the diameter of the particles each formed of the absorber included in the particles. The particle size is still more preferably 10 μm or more and 5 or more times as large as the diameter of the particles each formed of the absorber in the particles. In addition, from the viewpoint of obtaining high shaping accuracy, and the viewpoint of the ease of sintering or melting, the particle size of the particles each containing the absorber and the base material is preferably 200 μm or less, more preferably 150 μm or less.

In the particle size of the particles each containing the absorber and the base material, a calculation method for the diameter of the particles each formed of the absorber is as follows: the area of a particle formed of the absorber is measured with a scanning electron microscope (SEM) or the like, and the circle equivalent diameter of the area is obtained by calculation. A plurality (100 or more) of particles each formed of the absorber are subjected to the measurement, and their median is adopted as the diameter of the particles each formed of the absorber.

The particle size in this embodiment refers to the circle equivalent diameter (Heywood diameter) of each particle. The particle size of the particles contained in the inorganic material powder is not of each particle alone, but is the median of a group of particles having the same composition, and does not mean that no particle having a size other than that described as the particle size is contained in the powder. In addition, the calculation method for the particle size is applied to not only particles in a monocrystalline state, but also individual particles in a polycrystalline state or an aggregated state.

The inorganic material powder according to this embodiment is preferably free of any resin binder. This is because the resin binder has a markedly low melting point as compared to the other compounds contained in the powder, and hence has a risk of explosively burning up through irradiation with laser light to cause a void or a defect to be present in a shaped region.

Further, when the powder contains elemental carbon having sublimability, there is a risk in that carbon is bonded to oxygen to escape as a gas, with the result that a volume that has been occupied by elemental carbon becomes a void. Further, elemental carbon has a risk of subliming through irradiation with laser light to rapidly gasify, to thereby adversely influence shaping. Specifically, there is a risk in that the rapid gasification may apply a stress to a melted/solidified portion of the inorganic material, leading the solidified portion to be shaped in a deformed manner. Accordingly, the amount of elemental carbon contained in the powder is preferably small, particularly preferably 1,000 ppm or less in terms of molar ratio with respect to the metal elements of the plurality of compounds contained in the powder.

The inorganic material powder according to this embodiment is by no means limited as to, for example, whether the inorganic material powder is in a crystalline or noncrystalline state, or a mixture thereof. In addition, the powder and a shaped structural body do not need to be completely identical to each other in composition, and may be different from each other particularly in, for example, oxidation state or nitridization state.

(Absorber)

The absorber has a relatively high light-absorbing ability for light having the wavelength to be used in shaping, as compared to the base material contained in the inorganic material powder. Accordingly, when the powder according to this embodiment is used in the shaping of a structural body, the absorber contained in the powder absorbs laser light to generate heat. The resultant heat quantity causes sintering or melting of the base material in a portion that has been irradiated with the laser light, and thus the structural body is shaped. In addition, in contrast to the absorber of this embodiment, the compound serving as the base material desirably includes a metal oxide.

During the shaping of a structural body, part of the absorber is bonded to a gas in an atmosphere or another compound contained in the powder, or reduced through removal of part of its oxygen, to be converted into a compound different from that at the time of a powder state, to thereby be incorporated into the structural body. When the compound serving as the absorber is oxidized or reduced, the number of electrons capable of interacting with laser light is decreased to lower the light-absorbing ability. Accordingly, a region that has been shaped through irradiation with the laser light has a lower light-absorbing ability for the laser light than before the irradiation with the laser light.

Now, the actions and effects of the absorber contained in the powder according to this embodiment are described in detail.

The first action and effect of the absorber is that the absorber itself is increased in temperature by efficiently absorbing laser light to be used at the time of manufacture, and hence transfers heat to particles each containing any other compound present in a region corresponding to the focal point size of the laser light, to thereby cause a temperature increase. Thus, local heating corresponding to the focal point size of the laser light can be effectively achieved, and an interfacial portion between a shaped region (region that has been irradiated with the laser light) and a non-shaped region (region that has not been irradiated with the laser light) can be made distinct to enhance the shaping accuracy.

The second action and effect of the absorber is that, in a region in which shaping through irradiation with laser light has been completed, the light-absorbing ability of the absorber is lowered due to a change in composition, and hence the region in which shaping through irradiation with laser light has already been completed is suppressed from being altered by absorbing laser light again. Accordingly, the influence of laser light on a region in which shaping has already been completed, adjacent to the same powder layer as the region that has been irradiated with laser light, or adjacent to the stacking direction of the powder layer is suppressed, and a process margin for laser light irradiation conditions or the like can be increased. As a result, the influence of fluctuation in irradiation conditions on the shaping accuracy can be reduced.

As described above, when shaping is performed through selective irradiation with laser light using the powder according to this embodiment, the above-mentioned first action and effect and second action and effect are obtained, and thus shaping with high accuracy can be achieved. Those actions and effects are described with reference to a conceptual diagram illustrated in FIG. 1.

Figure 1:
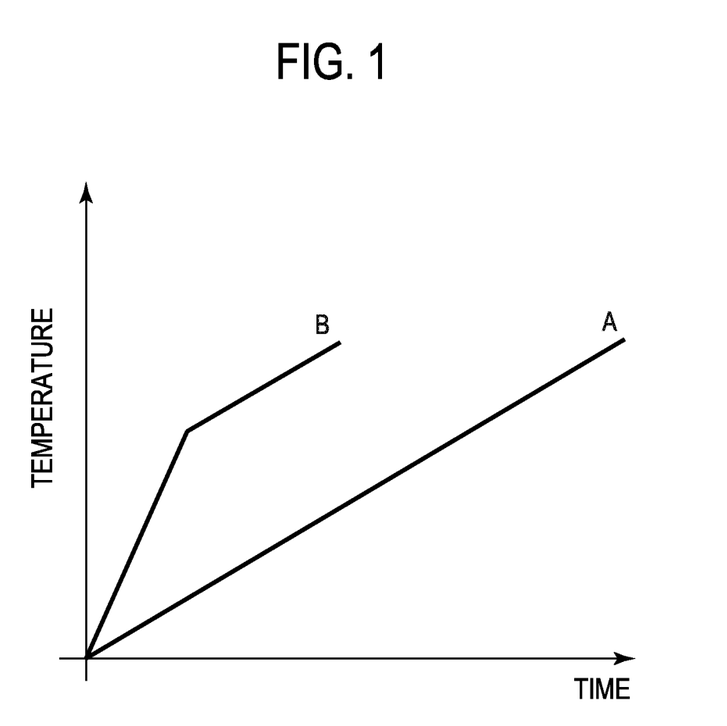
FIG. 1 is a conceptual diagram for illustrating a temperature increase process of each of an inorganic material powder containing an absorber and a powder containing no absorber.

In FIG. 1, the horizontal axis represents laser light irradiation time, and the vertical axis represents the temperature of a region that has been irradiated with laser light. A line A is a conceptualization of an increase in temperature of a powder containing no absorber, and a line B is a conceptualization of an increase in temperature of the inorganic material powder according to this embodiment containing the absorber. The powder containing no absorber is identical to the inorganic material powder according to this embodiment except for containing no absorber. FIG. 1 is just a diagram for illustrating concepts, and the temperature increase processes are not limited to the linear ones illustrated therein.

As illustrated by the line A, the powder containing no absorber starts a temperature increase through laser light irradiation. Meanwhile, as illustrated by the line B, the inorganic material powder according to this embodiment, when irradiated with laser light, immediately starts a temperature increase by virtue of the light-absorbing effect of the absorber. Eventually, when the absorbing ability of the absorber is lowered due to a change in composition thereof, the same slope as that of the line A for illustrating the increase in temperature of the powder containing no absorber is exhibited. That is, the same temperature increase rate is reached.

The powder containing no absorber, which exhibits the characteristic of the line A, has a low light-absorbing ability, and hence causes scattering of laser light, with the result that local heating cannot be achieved. Accordingly, heating efficiency is poor, and hence, in order to cause the powder in the region that has been irradiated with laser light to undergo a temperature increase to a temperature required for melting or sintering, input energy per unit volume needs to be increased. Consequently, a temperature difference between a portion that has been sintered, or melted and solidified in the region that has been irradiated with laser light and the powder therearound is not clear, and a large-width and low-density sintered portion is generated on the periphery of the region that has been irradiated with laser light. Thus, heating is widely extended even to the powder in a non-shaping portion adjacent thereto (portion not to be irradiated with laser light), and hence spatial shaping accuracy is not obtained.

Meanwhile, the inorganic material powder according to this embodiment, which exhibits the characteristic of the line B, has good heating efficiency, and hence local heating can be achieved. Accordingly, a temperature difference between the region that has been irradiated with laser light and the adjacent region can be sufficiently secured, and in the powder in the vicinity of a portion that has been sintered, or melted and solidified, only a small-width sintered portion is generated, and hence satisfactory shaping accuracy is obtained. Further, in a portion in which shaping through laser light irradiation has been completed, the light-absorbing ability is lowered to exhibit a characteristic similar to that of the powder containing no absorber, and hence, even when a region in which shaping has already been completed gets irradiated with laser light due to fluctuation in process conditions, the temperature increase is relatively small. Accordingly, the region is hardly subjected to the influence. A region that is being irradiated with laser light and the region that has been irradiated with laser light are bound to each other by fusion due to thermal conduction between the two regions, and hence no problem occurs with strength at a connection or boundary portion between a region shaped earlier and a region shaped later. Thus, in the shaping using the inorganic material powder according to this embodiment, which has the characteristic illustrated by the line B, the above-mentioned two actions and effects can be obtained.

Now, various absorbers are described in detail.

A compound suitable as the absorber is a metal oxide, such as $Ti_2O_3$, TiO, SiO, ZnO, antimony-doped tin oxide (ATO), indium-doped tin oxide (ITO), MnO, $MnO_2$, $Mn_2O_3$, $Mn_3O_4$, FeO, $Fe_2O_3$, $Fe_3O_4$, $Cu_2O$, CuO, $Cr_2O_3$, $CrO_3$, NiO, $V_2O_3$, $VO_2$, $V_2O_5$, $V_2O_4$, $Co_3O_4$, or CoO. In addition, a transition metal carbide, a transition metal nitride, $Si_3N_4$, AlN, a boride, and a silicide are also preferred. It is appropriate that one kind or a plurality of compounds having high affinity for the other compound(s) contained in the powder be selected therefrom as the absorber.

(Metal Oxide as Absorber)

Many metal oxides have low light-absorbing abilities for infrared rays, but $Ti_2O_3$, TiO, SiO, ZnO, antimony-doped tin oxide (ATO), indium-doped tin oxide (ITO), MnO, $MnO_2$, $Mn_2O_3$, $Mn_3O_4$, FeO, $Fe_2O_3$, $Fe_3O_4$, $Cu_2O$, CuO, $Cr_2O_3$, $CrO_3$, NiO, $V_2O_3$, $VO_2$, $V_2O_5$, $V_2O_4$, $Co_3O_4$, and CoO have high light-absorbing abilities for infrared rays, and hence are suitable as the absorber.

Each of those compounds absorbs laser light to change its metal element to a valence in a more stable state, thereby becoming a metal oxide having a relatively low light-absorbing ability for laser light. For example, $Ti_2O_3$ absorbs laser light to change its Ti from trivalent to tetravalent, changing from $Ti_2O_3$ in a metastable state to $TiO_2$ in a more stable state to have a lower light-absorbing ability for laser light.

In the case where the powder contains a metal oxide as the base material, the use of a metal oxide as the absorber is desired because the oxide contained in the base material is hardly reduced, and a degradation in characteristic due to oxygen deficiency is hardly caused in the resultant structural body. In addition, the metal oxide serving as the absorber generates little gas due to a change in composition through irradiation with laser light, and hence its addition amount to the inorganic material powder can be increased to enhance the light-absorbing ability of the inorganic material powder as a whole.

The particles each containing the absorber may each contain another oxide instead of containing a single compound. For example, even when particles each containing SiO as the absorber each contain $SiO_2$ in a stable state, SiO acts as the absorber. The oxygen amount of the absorber containing SiO may be measured using an inert gas fusion method. In addition, for the absorber containing SiO that contains $SiO_2$, their ratios may be calculated from the respective peak ratios of SiO and $SiO_2$ in X-ray diffraction. Such calculation method is applicable to not only a mixture of two kinds of compounds, but also a mixture of three or more kinds. However, in order to obtain high absorption efficiency, in the case of the metal oxide serving as the absorber, the main component (50 mol % or more) of the absorber is preferably selected from SiO, $Ti_2O_3$, TiO, ZnO, antimony-doped tin oxide (ATO), indium-doped tin oxide (ITO), MnO, $MnO_2$, $Mn_2O_3$, $Mn_3O_4$, FeO, $Fe_2O_3$, $Fe_3O_4$, $Cu_2O$, CuO, $Cr_2O_3$, $CrO_3$, NiO, $V_2O_3$, $VO_2$, $V_2O_5$, $V_2O_4$, $Co_3O_4$, and CoO.

(Transition Metal Carbide as Absorber)

A transition metal has an open-shell d orbital or f orbital, and hence the transition metal carbide is likely to have an interaction with laser light. Accordingly, the transition metal carbide has a high light-absorbing ability for laser light, and can suppress light diffusion in the inorganic material powder, and besides, transfers a large quantity of heat generated through absorption of laser light to the base material to enable local melting with a small input heat quantity. That is, in a manufacturing process, even when irradiation with laser light is performed at a low power output or by high-speed scanning, a precise structural body can be shaped. In addition, the transition metal carbide has a high light-absorbing ability for laser light, and hence can sufficiently function as the absorber even in a small addition amount.

Further, part of the transition metal carbide serving as the absorber is converted into a gas, such as carbon monoxide or carbon dioxide, through oxidation. However, unlike elemental carbon, the transition metal carbide does not have sublimability, and hence gasifies through a mild reaction. Accordingly, the transition metal carbide hardly causes a shaping failure, and hence is suitable as the absorber. A carbide produced by carbonization of part of the base material through laser irradiation may be incorporated into the structural body.

Examples of the transition metal carbide suitable as the absorber include TiC, ZrC, NbC, VC, HfC, WC, $Mo_2C$, TaC, WC—TiC, WC—TaC, and WC—TiC—TaC.

(Transition Metal Nitride as Absorber, and $Si_3N_4$ or AlN as Absorber)

A transition metal has an open-shell d orbital or f orbital, and hence the transition metal nitride is likely to have an interaction with laser light. Accordingly, the transition metal nitride has a high light-absorbing ability for laser light, and can suppress light diffusion in the powder, and besides, transfers a large quantity of heat generated through absorption of laser light to the base material to enable local melting with a small input heat quantity. That is, in a manufacturing process, even when irradiation with laser light is performed at a low power output or by high-speed scanning, a precise structural body can be shaped. In addition, the transition metal nitride has a high light-absorbing ability for laser light, and hence can sufficiently function as the absorber even in a small addition amount. Further, the transition metal nitride is preferred because the transition metal nitride has a high melting point, and hence can maintain its shape as the absorber until the base material is melted, thus functioning as the absorber.

Examples of the transition metal nitride suitable as the absorber include TiN, ZrN, VN, NON, TaN, $Cr_2N$, and HfN.

$Si_3N_4$ serving as the absorber is desired because $Si_3N_4$ absorbs laser light to react with oxygen in an atmosphere or the base material, and the resultant oxide is incorporated into the structural body. AlN is preferred because AlN absorbs laser light to react with oxygen in an atmosphere or the base material, and the resultant alumina is incorporated into the structural body.

Part of the nitrogen element of each of the transition metal nitride, $Si_3N_4$, and AlN may be bonded to oxygen in an atmosphere to be converted into a gas, such as nitrogen oxide. However, each of the transition metal nitride, $Si_3N_4$, and AlN does not have sublimability, and hence undergoes a mild reaction even when converted into a gas. Accordingly, a shaping failure hardly occurs. An oxynitride and/or a nitride produced by nitridization of part of the base material through a laser irradiation process may be incorporated into the structural body.

(Silicide as Absorber)

The silicide is suitable as an absorber because the silicide has a narrow band gap and characteristics close to those of a metal, and hence has a high light-absorbing ability. Further, the silicide does not contain a component that is bonded to another component to gasify, and hence generates hardly any gas through irradiation with laser light. In addition, the silicide absorbs laser light to react with oxygen in an atmosphere or the base material, and the resultant oxide is incorporated into a structural body. Accordingly, a shaping failure hardly occurs. For this reason, the silicide is preferred.

Examples of the silicide suitable as the absorber include $TiSi_2$, $ZrSi_2$, $NbSi_2$, $TaSi_2$, $CrSi_2$, $MoSi_2$, $WSi_2$, $FeSi_2$, and $HfSi_2$. The term "silicide" refers to a substance formed of a metal and silicon, and the above-mentioned SiC and $Si_3N_4$ are not included in the silicide.

(Boride as Absorber)

The boride does not contain a component that is bonded to another component to gasify, and hence generates hardly any gas through irradiation with laser light. In addition, the boride absorbs laser light to produce an oxide through a reaction with oxygen in an atmosphere or the base material. Further, the resultant oxide melts to be incorporated into the structural body, and hence a shaping failure hardly occurs. For this reason, the boride is preferred.

In addition, in the case of intending to obtain a noncrystalline structural body or a conductive structural body, the boride is preferably used as the absorber. Examples of the boride suitable as the absorber include $TiB_2$, $ZrB_2$, $VB_2$, $NbB_2$, $TaB_2$, CrB, MoB, WB, $LaB_6$, and $HfB_2$.

(Configuration of Absorber)

The constituent element ratio of the absorber contained in the powder according to this embodiment may be identified by combining SEM-EDX, TEM-EDX, electron beam diffraction, X-ray diffraction, ICP-AES, ICP-MS, X-ray fluorescence analysis, an inert gas fusion method, and the like. SEM-EDX refers to scanning electron microscope-energy dispersive X-ray spectroscopy, TEM-EDX refers to transmission electron microscope-energy dispersive X-ray spectroscopy, ICP-AES refers to inductively coupled plasma atomic emission spectroscopy, and ICP-MS refers to inductively coupled plasma mass spectrometry.

The absorber in this embodiment preferably has composition in the vicinity of an indicated stoichiometric ratio, but an error in constituent element ratio of within ±30% from a stoichiometric ratio normalized with a metal element is tolerated. For example, a case in which the absorber is SiO is included in this embodiment even when the constituent element ratio of the absorber is Si:O=1:1.30. From the viewpoint of obtaining a sufficient light-absorbing ability, the error in constituent element ratio is more preferably within ±20% from the stoichiometric ratio.

In order to obtain sufficient shaping accuracy, the light-absorbing ability of the absorber before irradiation with laser light preferably differs from the light-absorbing ability of the absorber changed in composition after the irradiation with laser light by 1.2 or more times, more preferably differs therefrom by 2 or more times. That is, through the irradiation of the absorber with laser light, its light-absorbing ability is preferably lowered to ⅚ or less times as high as that before the irradiation with laser light, and is more preferably lowered to ½ or less times. Laser light irradiation conditions are set in accordance with the light-absorbing ability of the absorber, and hence, when the light-absorbing ability is lowered to ⅚ or less times as high as that before the irradiation with laser light, even if a region in which shaping has been completed is irradiated with laser light under the same irradiation conditions, the region is not so influenced that the shaping accuracy is degraded.

Further, it is preferred that the light-absorbing ability before the irradiation of the absorber with laser light be 50% or more, and the light-absorbing ability of the absorber changed in composition after the irradiation with laser light be 40% or less, and it is more preferred that the light-absorbing ability before the irradiation with laser light be 60% or more, and the light-absorbing ability of the absorber changed in composition after the irradiation with laser light be 20% or less. In addition, the absorber changed in composition serves as a compound forming at least part of the structural body, and the light-absorbing ability may be determined by defining an absorption component to be the balance excluding a reflection component, through measurement of reflection with an integrating sphere by loading a powder of the compound (which does not need to be one extracted from the structural body) in a sample dish and radiating an assumed wavelength (the wavelength of laser to be radiated in a manufacturing process and/or a wavelength in the vicinity thereof) with a general spectrometer.

In this case, the "light-absorbing ability of the absorber" is the light-absorbing ability of the absorber alone.

By virtue of such lowering of the light-absorbing ability, a portion that has been sintered, or melted and solidified through irradiation with laser light once is hardly influenced when irradiated with laser light later, and hence the shape of the solidified portion is maintained. Thus, a precise three-dimensional structural body can be easily shaped as designed.

At least one particle formed of the absorber alone needs to be included in the focal point size of laser light. When the focal point size of the laser light is 10 μm in diameter, a region melted by the laser light may be regarded as a hemisphere having a diameter of 10 μm. In this case, when one particle formed of the absorber alone having a diameter of 1 μm is present in the melted region, the presence ratio of the particles each formed of the absorber alone in the melted region is about 0.5 vol %. Accordingly, the content of the absorber in the inorganic material powder is preferably 0.5 vol % or more. For the particles each containing the absorber and the base material, a similar discussion is applicable to a case in which the diameter of the particles each formed of the absorber in the particles is 1 μm.

Meanwhile, for the purpose of obtaining excellent shaping accuracy, the content of the absorber in the inorganic material powder is preferably 10 vol % or less. This is because the addition of a large amount of the absorber to the inorganic material powder may lower the shaping accuracy. This is conceivably because the temperature of a portion that has been irradiated with laser light is rapidly increased, and the melted material is scattered to the periphery. Particularly when the transition metal carbide, the transition metal nitride, or $Si_3N_4$ or AlN is used as the absorber, the light-absorbing ability for laser light is high as compared to a metal oxide serving as the absorber, and hence local melting can be performed through irradiation with a small quantity of light. That is, although the absorber is contained in the inorganic material powder in an addition amount as small as 0.5 vol % or more and 10 vol % or less, its function as an absorber can be sufficiently exhibited.

For example, a case in which 0.5 vol % of particles each formed of the absorber alone having a diameter of 1 μm are contained in the powder, and in which the tapped bulk density of a powder layer to be formed in a manufacturing process is 50% of the true density thereof is discussed. When the focal point size of laser light is 10 μm, a state in which 0.5 vol % of the particles each formed of the absorber alone having a diameter of 1 μm are contained in the inorganic material powder corresponds to a state in which, as described above, one particle formed of the absorber alone is probabilistically included in a region to be heated (volume of a hemisphere whose diameter is equal to the focal point size), and the absorber absorbs infrared rays to provide a heat-generating effect. When the focal point size of the laser light to be radiated is 100 μm, a state in which 0.5 vol % of particles each formed of the absorber alone having a diameter of 10 μm are contained in the powder corresponds to a state in which one particle is included in the region to be heated. As apparent from the foregoing, it is important to select the particle size of the particles each formed of the absorber alone in accordance with the focal point size of the laser light to be radiated to the powder in the manufacturing process. For the particles each containing the absorber and the base material, a discussion similar to the foregoing one is applicable to a case in which the diameter of the particles each formed of the absorber in the particles is 1 μm or 10 μm.

From the viewpoint of thermal uniformity, a state in which two or more particles each formed of the absorber alone are probabilistically included in the focal point size of the laser light is more preferred. The distance between a plurality of particles each formed of the absorber alone in a state of being contained in the inorganic material powder is preferably probabilistically 100 μm or less, more preferably 50 μm or less. In addition, it is also preferred to adjust the focal point size of the laser light so that such situation can be achieved. In consideration of the fact that the focal point size of the laser light is preferably 100 μm or less from the viewpoint of shaping accuracy, as described above, the particle size of the particles each formed of the absorber alone is preferably 1 μm or more and 10 μm or less. The focal point size of the laser light to be radiated only needs to be decided depending on desired shaping accuracy, and may be 100 μm or more depending on the required shaping accuracy. In that case, under a state in which two or more absorber particles are included in the focal point size of the laser light, the particle size may be more than 10 μm. Also for the particles each containing the absorber and the base material, a similar discussion is applicable to the diameter of the particles each formed of the absorber in the particles.

When an absorber other than a metal oxide is used as the absorber, the light-absorbing ability may be adjusted by arranging a modification layer on the surface of the absorber. The modification layer is suitably a metal oxide layer. When an absorber having an extremely high light-absorbing ability, such as the transition metal carbide or the transition metal nitride, is used, laser light that has entered the powder is strongly absorbed by the absorber present on a side close to a region that has been irradiated with laser light, and hence is hardly absorbed by the absorber at a position distant from the region that has been irradiated with laser light in some cases. As a result, the laser light that has entered the powder is difficult to uniformly transmit or diffuse in a powder layer. In such case, it is also preferred to adjust the light-absorbing ability by arranging the modification layer on the surface of the absorber.

(Base Material)

The base material is a compound serving as a main component of the powder other than the absorber. The base material is significantly associated with characteristics, such as strength, of a structural body, and hence is appropriately selected depending on applications. Accordingly, it is appropriate that: one kind or a plurality of kinds of compounds needed for achieving characteristics required of the structural body be selected as the base material; and a compound serving as the absorber be selected depending on the light-absorbing ability of the base material for the wavelength of laser light to be used in manufacture. When the structural body to be manufactured is not required to have specific characteristics, it is also preferred that: the composition of the absorber appropriate for the wavelength of laser light to be used at the time of the manufacture of the structural body be selected in advance; and a metal oxide having a relatively low effect of absorbing the wavelength of the laser light be selected as a compound serving as the base material.

The base material preferably contains a compound that is to form a eutectic at a ratio of forming a eutectic composition. The eutectic composition is a composition at a eutectic point shown in a eutectic state diagram, but in a manufacturing process using laser light, a heated state and a cooled state are repeated in an extremely rapid manner, and hence a eutectic structure is formed even with a composition deviated from the eutectic point. Accordingly, the eutectic composition in this embodiment is preferably defined as a composition range in which a eutectic structure is formed, and includes a range of ±10 mol % with respect to the eutectic composition according to the eutectic state diagram.

As the inorganic material suitable for the base material, aluminum oxide ($Al_2O_3$) or zirconium oxide ($ZrO_2$) (stabilized or partially stabilized) may be used. Further, silicon dioxide ($SiO_2$) may also be used. Further, an inorganic material, such as cordierite ($2MgO·2Al_2O_3·5SiO_2$), zircon ($ZrO_2·SiO_2$), mullite ($3Al_2O_3·2SiO_2$), yttrium oxide, or aluminum titanate, is also suitable. In addition, a plurality of compounds selected therefrom may be mixed and used as the base material.

The inorganic material powder according to this embodiment is formed of a plurality of compounds, and preferably contains at least one component as the absorber and at least one component selected from the group consisting of aluminum oxide, zirconium oxide, and silicon dioxide as the base material. Further, when a eutectic is formed, the structural body expresses a fine structure to achieve high strength, and in the manufacturing process, an effect such as lowering of the melting point of the base material is obtained. Accordingly, the powder according to this embodiment more preferably contains at least two components selected from the group consisting of aluminum oxide, zirconium oxide, and silicon dioxide as the base material. The base material is not limited to the ratio of forming a eutectic composition, and, for example, a base material having a mass ratio $Al_2O_3:ZrO_2$ of 85:15, or a base material having a mass ratio $Al_2O_3:ZrO_2$ of 70:30 may also be used.

When the powder contains aluminum oxide as the base material that is to form a eutectic, the powder preferably contains, in addition to aluminum oxide, particles each formed of a composite oxide of aluminum oxide and a rare-earth oxide. Specific examples thereof include: a powder containing particles each formed of a composite oxide of aluminum oxide ($Al_2O_3$) and gadolinium oxide ($Gd_2O_3$); and a powder containing aluminum oxide particles and particles each formed of a composite oxide ($GdAlO_3$) of gadolinium oxide and aluminum oxide. The effect of the addition of the composite oxide is not only obtained in a eutectic system of those two components, but also similarly obtained in a eutectic system of three or more components.

Silicon dioxide ($SiO_2$) is preferred as the base material, irrespective of being noncrystalline or crystalline. Silicon dioxide is not limited to being used as a powder containing two kinds of compounds with the absorber, and is also preferably used as a powder containing three components or four components together with zirconium oxide, aluminum oxide, and the like.

(Method of Manufacturing Structural Body)

The inorganic material powder according to this embodiment is suitably used in an additive manufacturing method involving performing shaping through irradiation of the inorganic material powder with laser light in accordance with slice data generated based on three-dimensional data on a structural body to be shaped. Specifically, the inorganic material powder is used in a manufacturing method using powder bed fusion or a cladding method. In the manufacturing process, the following step (i) and step (ii) are repeated to manufacture the structural body.

Step (i): a step of placing the inorganic material powder at a site to be irradiated with the laser light Step (ii): a step of irradiating the inorganic material powder with the laser light to sinter, or melt and solidify the inorganic material powder The expression "sinter, or melt and solidify" in this embodiment does not necessarily define a case in which none of the powder is melted as sintering, and a case in which there is no powder remaining unmelted as melting. The expression encompasses: a sintered state in which powders are merely bonded to each other; a state of partially including an unsintered portion; liquid-phase sintering after which a melted substance is present so as to surround powder; and a melted state in which part of the powder remains unmelted.

In addition, in the manufacturing method according to this embodiment, it is also preferred to perform heat treatment after the irradiation with the laser light as required. In this case, heating means is not limited, and a resistance heating system, an inductive heating system, an infrared lamp system, a laser system, an electron beam system, or the like may be selected and utilized depending on purposes. The heat treatment is also suited for adjusting the crystal grain size of the structural body for the purpose of, for example, enhancing the elaborateness or strength of the structural body. In addition, at the time of the heat treatment, it is also preferred that impregnation, coating, or the like be performed with a glaze that is not limited to an organic material or an inorganic material.

When the shaping is performed using the powder bed fusion, the steps (i) and (ii) are performed by spreading and leveling the powder according to this embodiment so as to have a predetermined thickness, and then irradiating the powder with the laser light. When the shaping is performed using the cladding method, the steps (i) and (ii) are performed by jetting the powder according to this embodiment to a predetermined site, and irradiating the predetermined site with the laser light.

The wavelength of the laser light to be used in the shaping is not limited, but laser light adjusted to a desired focal point size, such as a diameter of from 10 µm to 2 mm, in a lens or a fiber, is preferably used. The focal point size is one of the parameters that influence the shaping accuracy, and in order to satisfy a shaping accuracy of 100 µm (0.1 mm), in some situations, a line width is preferably comparable thereto, and the focal point size is preferably 100 µm or less in diameter. The irradiation with the laser light is not limited as to being continuous or pulsed. For the laser light, there may be used, for example, a laser having a wavelength in the vicinity of 1,000 nm, such as a Nd:YAG laser or a Yb fiber laser.

Figure 2:
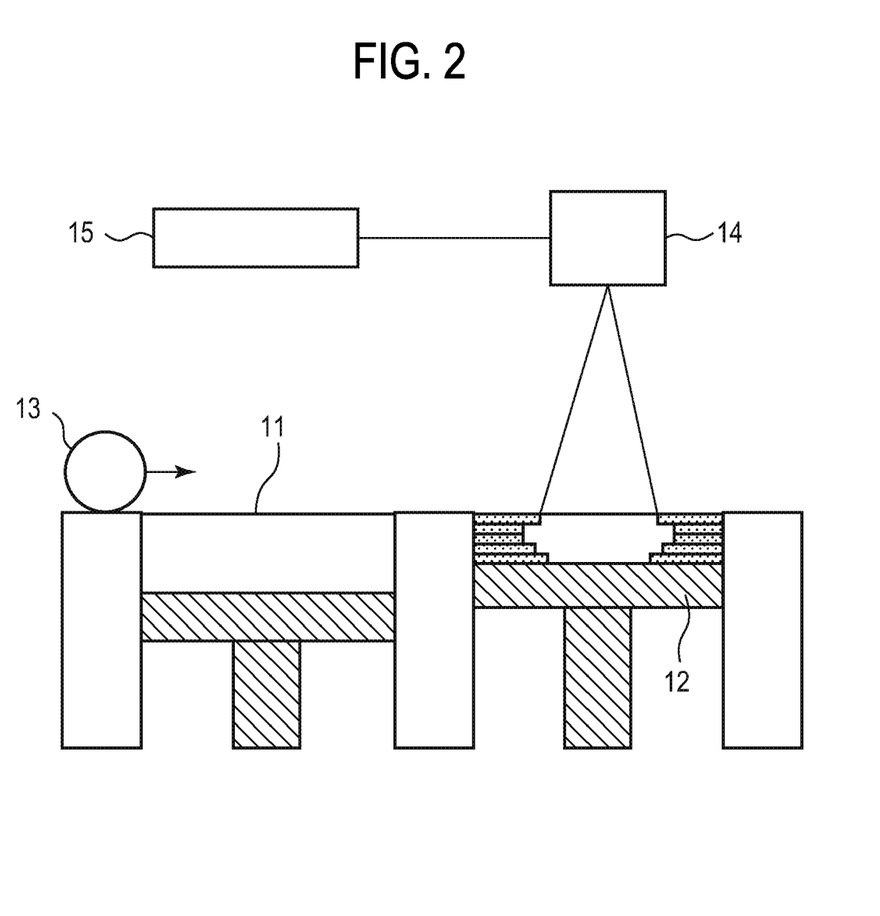
FIG. 2 is a schematic view of a shaping apparatus using powder bed fusion.

The powder bed fusion is described with reference to FIG. 2. An apparatus to be used in this system includes a powder vessel 11, a shaping stage portion 12, a recoater portion 13, a scanner portion 14, a light source 15 for laser light, and the like. Operation is as described below. While the powder vessel 11 and the shaping stage portion 12 are appropriately moved up and down, a powder is manipulated with the recoater portion 13, and the powder is spread and leveled so as to have a predetermined thickness over a region broader than an assumed structural body. Further, one cross-sectional shape of the structural body is directly drawn on the powder layer through use of laser light generated from the light source 15 for laser light and the scanner portion 14. The drawn region is sintered or melted and solidified. This operation is repeated to stack cross-sections of the structural body, to thereby shape the structural body.

Figure 3:
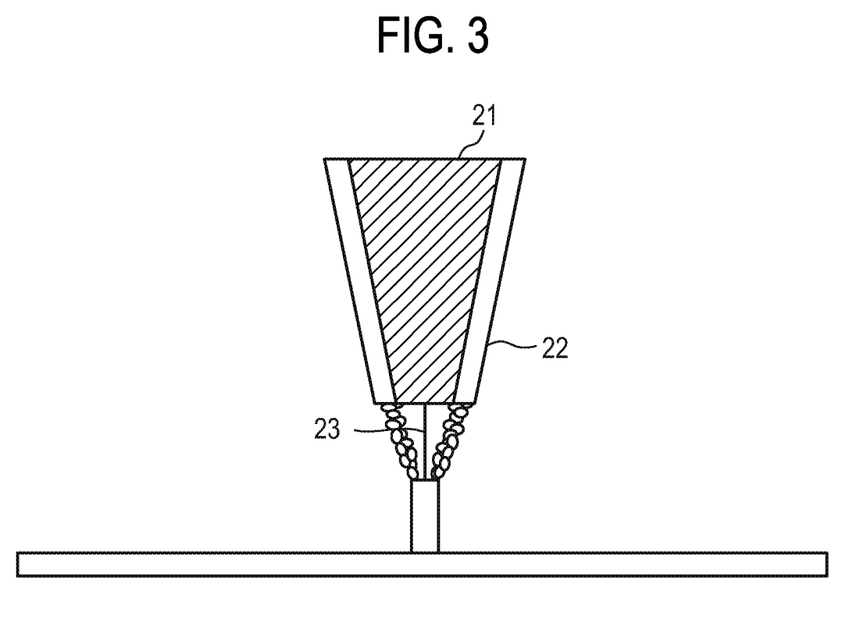
FIG. 3 is a schematic view of a shaping apparatus using a cladding method.

A cladding system is described with reference to FIG. 3. The cladding system is a technique involving jetting a powder from each of a plurality of powder supply holes 22 in a cladding nozzle 21, and irradiating a region in which the respective powders are focused with laser light 23, thereby sequentially shaping a structural body at a desired site, and has a feature in that shaping can be performed on a curved surface or the like.

In addition, in the manufacturing process, an atmosphere may be controlled. In the manufacturing process, not only the air atmosphere, but also an inert atmosphere containing nitrogen or another inert gas, such as a noble gas, an atmosphere in which compounds contained in the inorganic material powder are easily reduced, such as an atmosphere containing hydrogen and a reduced-pressure atmosphere, or an oxygen atmosphere is also preferably adopted. When such control of the atmosphere is performed, a powder containing a compound in a state of being oxidized or reduced from the stoichiometric ratio can be used in the shaping of a structural body.

In such manufacturing process of this embodiment as described above, the use of the powder according to this embodiment enables stable shaping, and can provide a structural body in which shaping accuracy is secured.

The structural body to be manufactured using the inorganic material powder according to this embodiment is not limited to one made of an inorganic material in a crystalline state. As long as desired physical property values are obtained, part or more than a half of the structural body may be in an amorphous state. In addition, through the above-mentioned manufacturing process, a structural body containing, for example, a region close to a metal state resulting from reduction of the inorganic material powder may be manufactured.

EXAMPLES

Specific examples of the inorganic material powder according to this embodiment are described.

Powders 1 to 63 obtained by adding various absorbers to base materials formed of aluminum oxide ($Al_2O_3$) and gadolinium oxide ($Gd_2O_3$) were investigated for achievable shaping rates to serve as Examples 1 to 63. As Comparative Example 1, the shaping rate of a powder 78 having no absorber added thereto was also investigated. Approximately spherical powders having average particle sizes of 20 μm and 25 μm were used for $Al_2O_3$ and $Gd_2O_3$, respectively. Particles having an average particle size of less than 5 μm were used for each of the absorbers of the powders 1 to 61. A powder having an average particle size of 20 μm was used for each of the absorbers of the powders 62 and 63. In the calculation of volume composition, $Al_2O_3$: 3.95 [g/cm$^3$], $Gd_2O_3$: 7.40 [g/cm$^3$], $Ti_2O_3$: 4.49 [g/cm$^3$], TiO: 4.95 [g/cm$^3$], SiO: 2.18 [g/cm$^3$], ZnO (Ga-doped): 5.50 [g/cm$^3$], ITO: 7.14 [g/cm$^3$], ATO: 6.60 [g/cm$^3$], TiN: 5.43 [g/cm$^3$], ZrN: 7.35 [g/cm$^3$], $Si_3N_4$: 3.17 [g/cm$^3$], TiC: 4.93 [g/cm$^3$], ZrC: 6.73 [g/cm$^3$], $TiSi_2$: 4.04 [g/cm$^3$], $ZrSi_2$: 4.86 [g/cm$^3$], $MoSi_2$: 6.24 [g/cm$^3$], $TiB_2$: 4.53 [g/cm$^3$], $ZrB_2$: 6.09 [g/cm$^3$], $LaB_6$: 4.72 [g/cm$^3$], and AlN: 3.26 [g/cm$^3$] were used as true densities. Even when the true density is a slightly different value, the essence of this embodiment is not influenced.

Powders containing those compounds were each spread and leveled on an $Al_2O_3$ substrate at a thickness of about 20 μm per layer, and then irradiated with Yb fiber laser light. States in each of which 20 layer were stacked were compared to each other. The laser light was fixed to a focal point size of 100 μm and a laser power of 30 W. In addition, a laser irradiation rate was varied among 100 mm/sec, 200 mm/sec, 300 mm/sec, 400 mm/sec, 500 mm/sec, 600 mm/sec, 700 mm/sec, and 1,000 mm/sec, and 10 lines each having a length of 4.5 mm were drawn at a pitch of 500 μm under each condition. The upper limit irradiation rate at which two or less lines underwent a shaping failure was defined as the line melting highest rate. The line melting highest rate corresponds to a threshold rate at which melting can be performed in a line shape, and in an actual manufacturing process, laser light is radiated at an irradiation rate lower than the line melting highest rate. A case in which, in a region that had been line-irradiated with laser light, a sintered, or melted and solidified region is not formed in a continuous line shape was judged to be a shaping failure. The results are shown in Table 1 and Table 2. The thickness per layer is about 20 μm, and hence the inorganic material powder contains particles equal to or more than the thickness of one layer. However, excess particles are removed during the spreading and leveling at an initial stage of stacking, and are buried in a stacked portion after a plurality of times of stacking.

TABLE 1

| | Powder name | Composition excluding absorber | | Absorber | | Achieved shaping rate [mm/sec] |
|---|---|---|---|---|---|---|
| | | $Al_2O_3$ [vol %] | $Gd_2O_3$ [vol %] | Kind | [vol %] | |
| Example 1 | Powder 1 | 64.40 | 32.73 | $Ti_2O_3$ | 2.87 | 600 |
| Example 2 | Powder 2 | 64.40 | 32.73 | TiO | 2.87 | 400 |
| Example 3 | Powder 3 | 64.40 | 32.73 | SiO | 2.87 | 400 |
| Example 4 | Powder 4 | 64.40 | 32.73 | ZnO (Ga doped) | 2.87 | 300 |
| Example 5 | Powder 5 | 64.40 | 32.73 | ITO | 2.87 | 500 |
| Example 6 | Powder 6 | 64.40 | 32.73 | ATO | 2.87 | 400 |
| Example 7 | Powder 7 | 64.40 | 32.73 | TiN | 2.87 | 1,000 |
| Example 8 | Powder 8 | 64.40 | 32.73 | ZrN | 2.87 | 1,000 |
| Example 9 | Powder 9 | 64.40 | 32.73 | $Si_3N_4$ | 2.87 | 500 |
| Example 10 | Powder 10 | 64.40 | 32.73 | TiC | 2.87 | 1,000 |
| Example 11 | Powder 11 | 64.40 | 32.73 | ZrC | 2.87 | 1,000 |
| Example 12 | Powder 12 | 64.40 | 32.73 | $TiSi_2$ | 2.87 | 1,000 |
| Example 13 | Powder 13 | 64.40 | 32.73 | $ZrSi_2$ | 2.87 | 1,000 |
| Example 14 | Powder 14 | 64.40 | 32.73 | $MoSi_2$ | 2.87 | 700 |
| Example 15 | Powder 15 | 64.40 | 32.73 | $TiB_2$ | 2.87 | 600 |
| Example 16 | Powder 16 | 64.40 | 32.73 | $ZrB_2$ | 2.87 | 700 |
| Example 17 | Powder 17 | 64.40 | 32.73 | $LaB_6$ | 2.87 | 1,000 |
| Example 18 | Powder 18 | 64.40 | 32.73 | AlN | 2.87 | 400 |
| Example 19 | Powder 19 | 64.40 | 35.10 | $Ti_2O_3$ | 0.50 | 400 |
| Example 20 | Powder 20 | 59.67 | 30.33 | $Ti_2O_3$ | 10.00 | 700 |
| Example 21 | Powder 21 | 64.40 | 34.60 | TiO | 1.00 | 300 |
| Example 22 | Powder 22 | 59.67 | 30.33 | TiO | 10.00 | 600 |
| Example 23 | Powder 23 | 64.40 | 34.60 | SiO | 1.00 | 300 |
| Example 24 | Powder 24 | 59.67 | 30.33 | SiO | 10.00 | 600 |
| Example 25 | Powder 25 | 64.40 | 34.38 | ZnO (Ga doped) | 1.22 | 300 |
| Example 26 | Powder 26 | 59.67 | 30.33 | ZnO (Ga doped) | 10.00 | 500 |
| Example 27 | Powder 27 | 64.40 | 34.80 | ITO | 0.80 | 400 |
| Example 28 | Powder 28 | 59.67 | 30.33 | ITO | 10.00 | 700 |
| Example 29 | Powder 29 | 64.40 | 34.60 | ATO | 1.00 | 300 |
| Example 30 | Powder 30 | 59.67 | 30.33 | ATO | 10.00 | 600 |

TABLE 2

| | | Composition excluding absorber | | Absorber | | Achieved shaping rate |
|---|---|---|---|---|---|---|
| | Powder name | Al$_2$O$_3$ [vol %] | Gd$_2$O$_3$ [vol %] | Kind | [vol %] | [mm/sec] |
| Example 31 | Powder 31 | 64.40 | 35.10 | TiN | 0.50 | 700 |
| Example 32 | Powder 32 | 64.40 | 34.60 | TiN | 1.00 | 1,000 |
| Example 33 | Powder 33 | 59.67 | 30.33 | TiN | 10.00 | 1,000 |
| Example 34 | Powder 34 | 64.40 | 35.10 | ZrN | 0.50 | 700 |
| Example 35 | Powder 35 | 64.40 | 34.60 | ZrN | 1.00 | 1,000 |
| Example 36 | Powder 36 | 59.67 | 30.33 | ZrN | 10.00 | 1,000 |
| Example 37 | Powder 37 | 64.40 | 34.60 | Si$_3$N$_4$ | 1.00 | 400 |
| Example 38 | Powder 38 | 59.67 | 31.33 | Si$_3$N$_4$ | 9.00 | 500 |
| Example 39 | Powder 39 | 64.40 | 35.10 | TiC | 0.50 | 1,000 |
| Example 40 | Powder 40 | 64.40 | 34.60 | TiC | 1.00 | 1,000 |
| Example 41 | Powder 41 | 59.67 | 30.33 | TiC | 10.00 | 1,000 |
| Example 42 | Powder 42 | 64.40 | 35.10 | ZrC | 0.50 | 700 |
| Example 43 | Powder 43 | 64.40 | 34.60 | ZrC | 1.00 | 1,000 |
| Example 44 | Powder 44 | 59.67 | 30.33 | ZrC | 10.00 | 1,000 |
| Example 45 | Powder 45 | 64.40 | 35.10 | TiSi$_2$ | 0.50 | 600 |
| Example 46 | Powder 46 | 64.40 | 34.60 | TiSi$_2$ | 1.00 | 700 |
| Example 47 | Powder 47 | 59.67 | 30.33 | TiSi$_2$ | 10.00 | 1,000 |
| Example 48 | Powder 48 | 64.40 | 35.10 | ZrSi$_2$ | 0.50 | 600 |
| Example 49 | Powder 49 | 64.40 | 34.60 | ZrSi$_2$ | 1.00 | 700 |
| Example 50 | Powder 50 | 59.67 | 30.33 | ZrSi$_2$ | 10.00 | 1,000 |
| Example 51 | Powder 51 | 64.40 | 35.10 | MoSi$_2$ | 0.50 | 400 |
| Example 52 | Powder 52 | 64.40 | 34.60 | MoSi$_2$ | 1.00 | 500 |
| Example 53 | Powder 53 | 59.67 | 30.33 | MoSi$_2$ | 10.00 | 700 |
| Example 54 | Powder 54 | 64.40 | 34.60 | TiB$_2$ | 1.00 | 400 |
| Example 55 | Powder 55 | 59.67 | 30.33 | TiB$_2$ | 10.00 | 700 |
| Example 56 | Powder 56 | 64.40 | 34.80 | ZrB$_2$ | 0.80 | 400 |
| Example 57 | Powder 57 | 59.67 | 30.33 | ZrB$_2$ | 10.00 | 700 |
| Example 58 | Powder 58 | 64.40 | 35.10 | LaB$_6$ | 0.50 | 700 |
| Example 59 | Powder 59 | 59.67 | 30.33 | LaB$_6$ | 10.00 | 1,000 |
| Example 60 | Powder 60 | 64.40 | 35.10 | AlN | 0.50 | 300 |
| Example 61 | Powder 61 | 59.67 | 31.33 | AlN | 9.00 | 500 |
| Example 62 | Powder 62 | 40.00 | 10.00 | Ti$_2$O$_3$ | 50.00 | 700 |
| Example 63 | Powder 63 | 40.00 | 10.00 | SiO | 50.00 | 600 |
| Comparative Example 1 | Powder 78 | 64.39 | 35.61 | — | 0 | 100 |

In Comparative Example 1, owing to the use of the powder 78 containing no absorber, sintering, or melting and solidification was able to be performed in a line shape only at 100 mm/sec. That is, in the manufacturing process, laser light needs to be radiated at a slower rate, leading to low productivity, and hence the powder 78 is not suited for shaping. Besides, many protrusions were found in the line-shaped solidified portion of Comparative Example 1, and hence sufficient shaping accuracy was not obtained. A conceivable cause thereof is that, when the powder 78 of Comparative Example 1 not containing the absorber of this embodiment was irradiated with laser light, the light was randomly diffused in the powder to the outside of the periphery of the laser light irradiation, with the result that the melting of the powder proceeded also on the outside of the region irradiated with the laser light.

Next, for powders 64 to 77, the compositions of particles forming the inorganic material powders and the diameters of the particles are shown in Tables 3 and 4, and the ratios (volume) of the particles forming the inorganic material powders with respect to the inorganic material powders are shown in Tables 5 and 6. Particles close to a spherical shape were used for compounds other than absorbers. Particles having a particle size of less than 5 μm were used for the absorbers. Numerical values in parentheses in Table 3 and Table 4 represent molar ratios of the compounds forming the particles. For example, ZrO$_2$·Y$_2$O$_3$ (97.0:3.0) indicates that the particles are formed of Al$_2$O$_3$ and ZrO$_2$ at a molar ratio of 97.0:3.0.

TABLE 3

| | Al$_2$O$_3$ | ZrO$_2$·Y$_2$O$_3$ (97.0:3.0) | Gd$_2$O$_3$ | Y$_2$O$_3$ | SiO$_2$ |
|---|---|---|---|---|---|
| Diameter [μm] | 20 | 30 | 25 | 23 | 28 |

TABLE 4

| | Al$_2$O$_3$·ZrO$_2$ (87.3:12.7) | Al$_2$O$_3$·ZrO$_2$ (73.8:26.2) | MgO·Al$_2$O$_3$·SiO$_2$ (22.2:22.2:55.6) | SiO$_2$·Li$_2$CO$_3$ (70.5:29.5) | BaTiO$_3$ | Pb(Zr, Ti)O$_3$ |
|---|---|---|---|---|---|---|
| Diameter [μm] | 39 | 109 | 121 | 34 | 32 | 28 |

TABLE 5

| Composition [vol %] | Al$_2$O$_3$ | ZrO$_2$•Y$_2$O$_3$ (97.0:3.0) | Gd$_2$O$_3$ | Y$_2$O$_3$ | SiO$_2$ | Ti$_2$O$_3$ | ZrN |
|---|---|---|---|---|---|---|---|
| Powder 64 | 97.15 | — | — | — | — | 2.85 | — |
| Powder 65 | — | 97.15 | — | — | — | 2.85 | — |
| Powder 66 | 64.40 | — | 32.74 | — | — | 2.86 | — |
| Powder 67 | 64.40 | — | 34.92 | — | — | 0.68 | — |
| Powder 68 | 66.11 | — | — | 31.03 | — | 2.86 | — |
| Powder 69 | 63.85 | — | 33.29 | — | — | — | 2.86 |
| Powder 70 | 65.64 | — | — | 31.79 | — | — | 2.57 |
| Powder 71 | 60.29 | 6.41 | 30.43 | — | — | 2.87 | — |
| Powder 72 | — | — | — | — | 97.13 | 2.87 | — |
| Powder 73 | 4.73 | — | — | — | 92.41 | 2.86 | — |
| Powder 74 | — | 4.50 | — | — | 92.63 | 2.87 | — |
| Powder 79 | 64.39 | — | 35.61 | — | — | — | — |

TABLE 6

| Composition [vol %] | Al$_2$O$_3$•ZrO$_2$ (87.3:12.7) | Al$_2$O$_3$•ZrO$_2$ (73.8:26.2) | MgO•Al$_2$O$_3$•SiO$_2$ | SiO$_2$•Li$_2$CO$_3$ | BaTiO$_3$ | Pb (Zr, Ti)O$_3$ | Ti$_2$O$_3$ | ZrN | SiO |
|---|---|---|---|---|---|---|---|---|---|
| Powder 75 | 97.15 | — | — | — | — | — | 2.85 | — | — |
| Powder 76 | — | 97.15 | — | — | — | — | 2.85 | — | — |
| Powder 77 | — | — | 97.14 | — | — | — | — | 2.86 | — |
| Powder 80 | — | — | — | 97.13 | — | — | — | — | 2.87 |
| Powder 81 | — | — | — | — | 97.15 | — | 2.85 | — | — |
| Powder 82 | — | — | — | — | — | 97.20 | 2.50 | — | — |
| Powder 83 | 97.15 | — | — | — | — | — | — | — | — |
| Powder 84 | 97.15 | — | — | — | — | — | — | — | — |
| Powder 85 | 97.15 | — | — | — | — | — | — | — | — |
| Powder 86 | 97.15 | — | — | — | — | — | — | — | — |
| Powder 87 | 97.15 | — | — | — | — | — | — | — | — |
| Powder 88 | 97.15 | — | — | — | — | — | — | — | — |

| Composition [vol %] | Mn$_3$O$_4$ | Fe$_3$O$_4$ | CuO | Cr$_2$O$_3$ | NiO | VO$_5$ | CoO |
|---|---|---|---|---|---|---|---|
| Powder 75 | — | — | — | — | — | — | — |
| Powder 76 | — | — | — | — | — | — | — |
| Powder 77 | — | — | — | — | — | — | — |
| Powder 80 | — | — | — | — | — | — | — |
| Powder 81 | — | — | — | — | — | — | — |
| Powder 82 | 0.30 | — | — | — | — | — | — |
| Powder 83 | — | 2.85 | — | — | — | — | — |
| Powder 84 | — | — | 2.85 | — | — | — | — |
| Powder 85 | — | — | — | 2.85 | — | — | — |
| Powder 86 | — | — | — | — | 2.85 | — | — |
| Powder 87 | — | — | — | — | — | 2.85 | — |
| Powder 88 | — | — | — | — | — | — | 2.85 |

(Determination of Three-dimensional Shaping Property of each Powder)

Next, the three-dimensional shaping property of the powder of each of Examples described above was investigated. In the investigation, DMP100 of the ProX (product name) series of 3D Systems, Inc. was used as a shaping apparatus. In each of Examples 64 to 149 using the powders 1 to 77 and powders 80 to 88, and Comparative Example 2 using a powder 79 containing no absorber, a 6 mm×6 mm structural body was shaped under shaping conditions shown in Table 7 or 8. In addition, in each of Examples 64 to 149 and Comparative Example 2, the thickness of a powder layer was set to 20 μm, and an alumina plate was used as a substrate. The thickness of the powder layer refers to a value by which the shaping stage portion 12 of FIG. 2 is descended. Through irradiation with laser light, the powder layer melts and shrinks in its thickness direction, and hence the apparent thickness of the powder layer is gradually increased as stacking is repeated, eventually converging to the range of from 67 μm to 133 μm. In addition, particle sizes shown in Tables 3 and 4 are each the median of a group of particles. Accordingly, the average particle size of particles containing compounds shown in Tables 3 and 4 is larger than the powder layer in the manufacturing process, i.e., 20 μm, but does not cause a problem in use. A structural body that was able to be shaped was measured for its surface roughness Ra using Alpha-Step D500 (product name) manufactured by KLA Tencor Corporation to determine shaping accuracy. The structural body has relatively larger roughness on a side surface thereof than on a front surface thereof, and hence evaluation was performed on the side surface. In addition, a scan width at the time of the measurement of the surface roughness is 1 mm.

For the shaping property, the following evaluation was performed.

A: A structural body as per specified dimensions is obtained with a high shaping accuracy of 20 μm or less in terms of Ra.

B: A roughness of 20 μm or more in terms of Ra occurs on the front surface or the side surface.

C: The shape is not formed.

In the above-mentioned evaluation, A indicates that the shaping property is satisfactory, B indicates that the shaping property is rather unsatisfactory, and C indicates that the shaping property is unsatisfactory.

TABLE 7

|  | Powder | Laser power [W] | Laser irradiation rate [mm/s] | Laser irradiation line pitch [μm] | Shaping property | Roughness on side surface of shaped object Ra [μm] |
|---|---|---|---|---|---|---|
| Example 64 | Powder 1 | 40 | 180 | 100 | A | 15.5 |
| Example 65 | Powder 2 | 30 | 100 | 100 | A | 16.0 |
| Example 66 | Powder 3 | 30 | 100 | 100 | A | 18.0 |
| Example 67 | Powder 4 | 30 | 80 | 100 | B | 26.9 |
| Example 68 | Powder 5 | 30 | 120 | 100 | A | 17.1 |
| Example 69 | Powder 6 | 30 | 100 | 100 | A | 17.7 |
| Example 70 | Powder 7 | 30 | 250 | 100 | A | 13.4 |
| Example 71 | Powder 8 | 40 | 270 | 100 | A | 14.0 |
| Example 72 | Powder 9 | 30 | 120 | 100 | B | 21.6 |
| Example 73 | Powder 10 | 30 | 250 | 100 | A | 14.5 |
| Example 74 | Powder 11 | 30 | 270 | 100 | A | 14.3 |
| Example 75 | Powder 12 | 30 | 250 | 100 | A | 15.8 |
| Example 76 | Powder 13 | 30 | 250 | 100 | A | 16.9 |
| Example 77 | Powder 14 | 30 | 180 | 100 | B | 22.2 |
| Example 78 | Powder 15 | 30 | 150 | 100 | B | 25.1 |
| Example 79 | Powder 16 | 30 | 180 | 100 | A | 19.0 |
| Example 80 | Powder 17 | 30 | 250 | 100 | A | 17.2 |
| Example 81 | Powder 18 | 30 | 100 | 100 | B | 26.4 |
| Example 82 | Powder 19 | 40 | 120 | 100 | B | 20.9 |
| Example 83 | Powder 20 | 30 | 150 | 100 | A | 19.7 |
| Example 84 | Powder 21 | 30 | 80 | 100 | B | 21.3 |
| Example 85 | Powder 22 | 30 | 150 | 100 | A | 15.4 |
| Example 86 | Powder 23 | 30 | 80 | 100 | B | 22.8 |
| Example 87 | Powder 24 | 30 | 120 | 100 | A | 18.4 |
| Example 88 | Powder 25 | 30 | 80 | 100 | B | 19.5 |
| Example 89 | Powder 26 | 30 | 120 | 100 | B | 24.0 |
| Example 90 | Powder 27 | 30 | 100 | 100 | B | 26.0 |
| Example 91 | Powder 28 | 30 | 180 | 100 | B | 21.6 |
| Example 92 | Powder 29 | 30 | 80 | 100 | B | 23.3 |
| Example 93 | Powder 30 | 30 | 150 | 100 | B | 23.8 |
| Example 94 | Powder 31 | 40 | 200 | 100 | A | 16.5 |
| Example 95 | Powder 32 | 30 | 250 | 100 | A | 17.3 |
| Example 96 | Powder 33 | 20 | 200 | 100 | B | 24.0 |
| Example 97 | Powder 34 | 40 | 200 | 100 | A | 14.3 |
| Example 98 | Powder 35 | 30 | 250 | 100 | A | 14.7 |
| Example 99 | Powder 36 | 20 | 200 | 100 | B | 21.1 |
| Example 100 | Powder 37 | 30 | 100 | 100 | B | 20.7 |
| Example 101 | Powder 38 | 30 | 120 | 100 | A | 16.9 |
| Example 102 | Powder 39 | 30 | 200 | 100 | A | 15.2 |
| Example 103 | Powder 40 | 30 | 250 | 100 | A | 16.6 |
| Example 104 | Powder 41 | 20 | 200 | 100 | B | 23.9 |
| Example 105 | Powder 42 | 40 | 150 | 100 | A | 16.1 |

TABLE 8

|  | Powder | Laser power [W] | Laser irradiation rate [mm/s] | Laser irradiation line pitch [μm] | Shaping property | Roughness on side surface of shaped object Ra [μm] |
|---|---|---|---|---|---|---|
| Example 106 | Powder 43 | 30 | 180 | 100 | A | 13.5 |
| Example 107 | Powder 44 | 20 | 200 | 100 | B | 26.1 |
| Example 108 | Powder 45 | 30 | 150 | 100 | A | 15.2 |
| Example 109 | Powder 46 | 30 | 140 | 100 | A | 17.4 |
| Example 110 | Powder 47 | 20 | 150 | 100 | B | 24.6 |
| Example 111 | Powder 48 | 30 | 150 | 100 | A | 15.8 |
| Example 112 | Powder 49 | 30 | 160 | 100 | A | 13.5 |
| Example 113 | Powder 50 | 20 | 200 | 100 | B | 22.5 |
| Example 114 | Powder 51 | 30 | 250 | 100 | B | 23.0 |
| Example 115 | Powder 52 | 30 | 100 | 100 | B | 21.2 |
| Example 116 | Powder 53 | 30 | 180 | 100 | A | 15.6 |
| Example 117 | Powder 54 | 30 | 100 | 100 | B | 20.4 |
| Example 118 | Powder 55 | 30 | 180 | 100 | B | 27.5 |
| Example 119 | Powder 56 | 30 | 100 | 100 | A | 17.7 |
| Example 120 | Powder 57 | 30 | 180 | 100 | B | 21.1 |

TABLE 8-continued

| | Powder | Laser power [W] | Laser irradiation rate [mm/s] | Laser irradiation line pitch [μm] | Shaping property | Roughness on side surface of shaped object Ra [μm] |
|---|---|---|---|---|---|---|
| Example 121 | Powder 58 | 30 | 180 | 100 | A | 14.4 |
| Example 122 | Powder 59 | 30 | 250 | 100 | B | 21.4 |
| Example 123 | Powder 60 | 30 | 80 | 100 | B | 25.8 |
| Example 124 | Powder 61 | 30 | 120 | 100 | A | 19.2 |
| Example 125 | Powder 62 | 30 | 180 | 100 | B | 29.3 |
| Example 126 | Powder 63 | 30 | 150 | 100 | B | 28.8 |
| Example 127 | Powder 64 | 47.5 | 150 | 100 | B | 19.3 |
| Example 128 | Powder 65 | 45 | 60 | 100 | B | 21.9 |
| Example 129 | Powder 66 | 30 | 140 | 100 | A | 16.7 |
| Example 130 | Powder 67 | 30 | 110 | 100 | A | 15.0 |
| Example 131 | Powder 68 | 30 | 130 | 100 | A | 13.3 |
| Example 132 | Powder 69 | 30 | 160 | 100 | A | 14.0 |
| Example 133 | Powder 70 | 30 | 120 | 100 | B | 24.1 |
| Example 134 | Powder 71 | 30 | 130 | 120 | A | 16.5 |
| Example 135 | Powder 72 | 47.5 | 60 | 100 | B | 21.1 |
| Example 136 | Powder 73 | 47.5 | 80 | 100 | B | 20.2 |
| Example 137 | Powder 74 | 47.5 | 60 | 100 | B | 19.9 |
| Example 138 | Powder 75 | 30 | 120 | 100 | A | 18.0 |
| Example 139 | Powder 76 | 30 | 120 | 100 | A | 12.6 |
| Example 140 | Powder 77 | 40 | 100 | 100 | B | 18.9 |
| Example 141 | Powder 80 | 40 | 100 | 100 | B | 17.8 |
| Example 142 | Powder 81 | 40 | 100 | 100 | B | 14.6 |
| Example 143 | Powder 82 | 30 | 120 | 100 | A | 15.7 |
| Example 144 | Powder 83 | 30 | 120 | 100 | A | 16.8 |
| Example 145 | Powder 84 | 30 | 120 | 100 | A | 19.4 |
| Example 146 | Powder 85 | 30 | 120 | 100 | A | 17.4 |
| Example 147 | Powder 86 | 30 | 120 | 100 | B | 19.3 |
| Example 148 | Powder 87 | 30 | 120 | 100 | B | 18.1 |
| Example 149 | Powder 88 | 30 | 120 | 100 | B | 18.9 |
| Comparative Example 2 | Powder 79 | 50 | 60 | 50 | C | Unmeasurable |

As shown in Table 7, in Comparative Example 2 containing no absorber, as in Comparative Example 1, part of the powder melted, and a structural body part of which was significantly depressed or protruded was obtained. However, the structural body obtained in Comparative Example 2 significantly deviated from the intended cubic shape, and the intended shape was not obtained.

In the shaping process using the powder according to this embodiment, the structural bodies of Examples 64 to 149 were each in the intended cubic shape, and each allowed for the measurement of the surface roughness on the side surface. It was able to be recognized that the use of the powder according to this embodiment improved the surface roughness as compared to that in the related art, and provided a structural body improved in Ra to 30 something μm or less, enabling accurate shaping of a structural body. In each of Examples 64 to 124 and Examples 127 to 149 using a powder in which the content of the absorber was 10 vol % or less, an even higher shaping accuracy of less than 28 μm in terms of Ra was obtained than in each of Example 125 and Example 126 using a powder in which the content of the absorber was 50 vol %.

The powder of the present invention allows a ceramic structural body to be manufactured with high shaping accuracy through use of powder bed fusion or a cladding system, and can be utilized in the field of parts required to have complex shapes.

Through use of the inorganic material powder of the present invention, shaping with high shaping accuracy can be achieved because the diffusion of the laser light is reduced by the absorber having a high light-absorbing ability for the laser light.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A powder to be used in an additive manufacturing method involving performing shaping a structural body through irradiation with laser light, the powder comprising:
   an inorganic compound serving as a base material to form a eutectic in the structural body; and
   an absorber having a higher light-absorbing ability for the laser light than the base material,
   wherein a content of the base material in the powder is 90 vol % to 99.5 vol %,
   wherein a content of the absorber in the powder is 0.5 vol % to 10 vol %, and
   wherein the absorber is a particle comprising at least one selected from the group consisting of $Ti_2O_3$, TiO, SiO, ZnO, antimony-doped tin oxide (ATO), indium-doped tin oxide (ITO), MnO, $MnO_2$, $Mn_2O_3$, $Mn_3O_4$, FeO, $Fe_2O_3$, $Fe_3O_4$, $Cu_2O$, $Cr_2O_3$, $CrO_3$, NiO, $V_2O_3$, $VO_2$, $V_2O_5$, $V_2O_4$, and $Co_3O_4$.

2. The powder according to claim 1, wherein the base material comprises a plurality of compounds.

3. The powder according to claim 1, wherein the base material comprises at least one selected from the group consisting of $SiO_2$, $Al_2O_3$, and $ZrO_2$.

4. The powder according to claim 3, wherein the base material comprises a rare-earth oxide or a composite oxide thereof.

5. The powder according to claim 1, wherein the base material comprises two or more components to form the eutectic in a range of ±10 mol % with respect to a eutectic composition of the eutectic, the eutectic composition being a composition at a eutectic point in a eutectic state diagram of the eutectic.

6. A method of manufacturing a structural body comprising repeating:
a step (i) of placing the powder of claim 1 at a site to be irradiated with the laser light; and
a step (ii) of irradiating a predetermined site of the powder with the laser light to sinter, or melt and solidify the powder.

7. The method according to claim 6, wherein the step (i) is a step of laying the powder.

8. The method according to claim 6, wherein the step (i) is performed as a step of jetting the powder to the predetermined site.

9. The powder according to claim 1, wherein the absorber comprises at least one selected from the group consisting of $Ti_2O_3$, TiO, SiO, antimony-doped tin oxide (ATO), indium-doped tin oxide (ITO), MnO, $Mn_2O_3$, $Mn_3O_4$, FeO, $Fe_2O_3$, $Cu_2O$, $CrO_3$, NiO, $V_2O_3$, $VO_2$, $V_2O_5$, $V_2O_4$, and $Co_3O_4$.

10. The powder according to claim 1, wherein the absorber comprises at least one selected from the group consisting of $Ti_2O_3$, TiO, SiO, antimony-doped tin oxide (ATO), and indium-doped tin oxide (ITO).

11. The powder according to claim 1, wherein the absorber comprises SiO.

12. The powder according to claim 11, wherein the base material comprises $SiO_2$.

13. The powder according to claim 1, wherein the powder includes particles, each comprising SiO and $SiO_2$.

14. The powder according to claim 1, wherein the powder includes a first plurality of particles comprising the base material and a second plurality of particles comprising the absorber,
wherein the second plurality of particles has a higher light-absorbing ability for the laser light than the first plurality of particles, and
wherein a median particle size of the first plurality of particles is larger than a median particle size of the second plurality of particles.

15. The powder according to claim 14, wherein the median particle size of the first plurality of particles is 5 or more times the median particle size of the second plurality of particles.

16. The powder according to claim 14, wherein the median particle size of the first plurality of particles is 5 μm to 200 μm.

17. The powder according to claim 14, wherein the median particle size of the second plurality of particles is 1 μm to 10 μm.

18. The method according to claim 6, wherein the absorber is such a compound that at least part of the absorber is converted, by the irradiation with the laser light, into a compound having a lower light-absorbing ability for the laser light than the absorber.

19. The method according to claim 18, wherein the light-absorbing ability of the compound having the lower light-absorbing ability than the absorber is ⅚ or less of the light-absorbing ability of the absorber.

20. The method according to claim 18, wherein the light-absorbing ability of the compound having the lower light-absorbing ability than the absorber is ½ or less of the light-absorbing ability of the absorber.

* * * * *